(12) United States Patent
Anand et al.

(10) Patent No.: US 9,112,912 B1
(45) Date of Patent: Aug. 18, 2015

(54) SECURITY DEVICE FOR PREEMPTIVELY DETERMINING POLICIES

(71) Applicant: Juniper Networks, Inc., Sunnyvale, CA (US)

(72) Inventors: Chetan Anand, San Jose, CA (US); Balaji Balasubramanian, San Jose, CA (US); Arjun Sambamoorthy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/162,187

(22) Filed: Jan. 23, 2014

(51) Int. Cl.
*G06F 11/07* (2006.01)
*H04L 29/06* (2006.01)

(52) U.S. Cl.
CPC .............. *H04L 63/20* (2013.01); *H04L 67/42* (2013.01)

(58) Field of Classification Search
CPC .................................................. G06F 11/0781
See application file for complete search history.

(56) References Cited

U.S. PATENT DOCUMENTS

| | | | | |
|---|---|---|---|---|
| 2008/0175226 A1* | 7/2008 | Alperovitch et al. | .......... | 370/352 |
| 2009/0172801 A1* | 7/2009 | Friedrich et al. | ................ | 726/12 |
| 2011/0167474 A1* | 7/2011 | Sinha et al. | ........................ | 726/1 |
| 2013/0166513 A1* | 6/2013 | Rajaram | ........................ | 707/687 |
| 2014/0310765 A1* | 10/2014 | Stuntebeck et al. | .............. | 726/1 |

* cited by examiner

*Primary Examiner* — Josnel Jeudy
(74) *Attorney, Agent, or Firm* — Harrity & Harrity, LLP

(57) ABSTRACT

A device is configured to receive a first request sent from a user device to a server. The first request may include a request to receive particular information from the server. The device receives a response to the first request sent from the server to the user device. The response includes the particular information. The device determines a potential request from the user device based on the particular information included in the response. The devices determines a policy associated with the potential request prior to a second request corresponding to the potential request being received. The device receives the second request from the user device. The device processes the second request based on the policy that was determined prior to the second request being received.

20 Claims, 8 Drawing Sheets

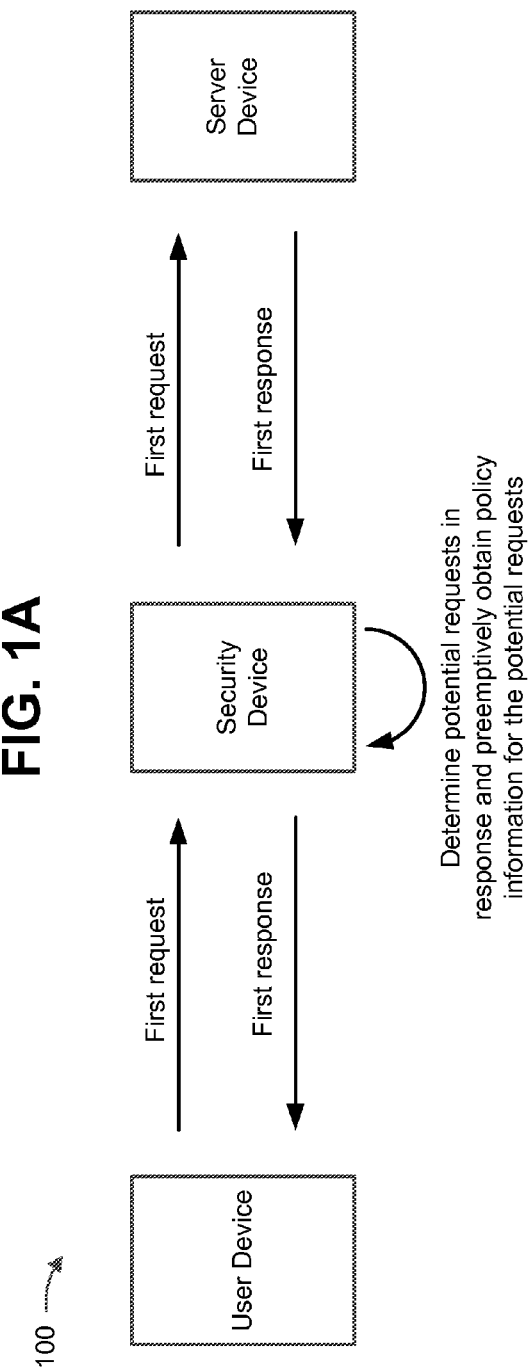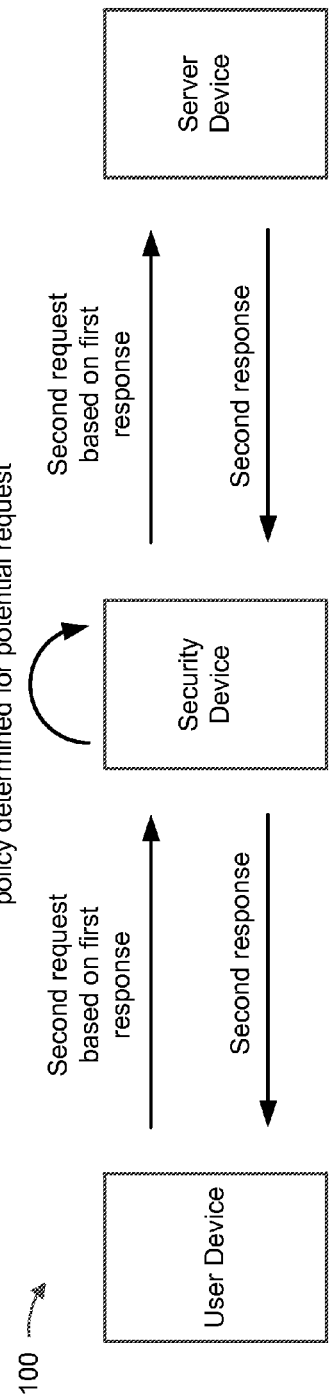

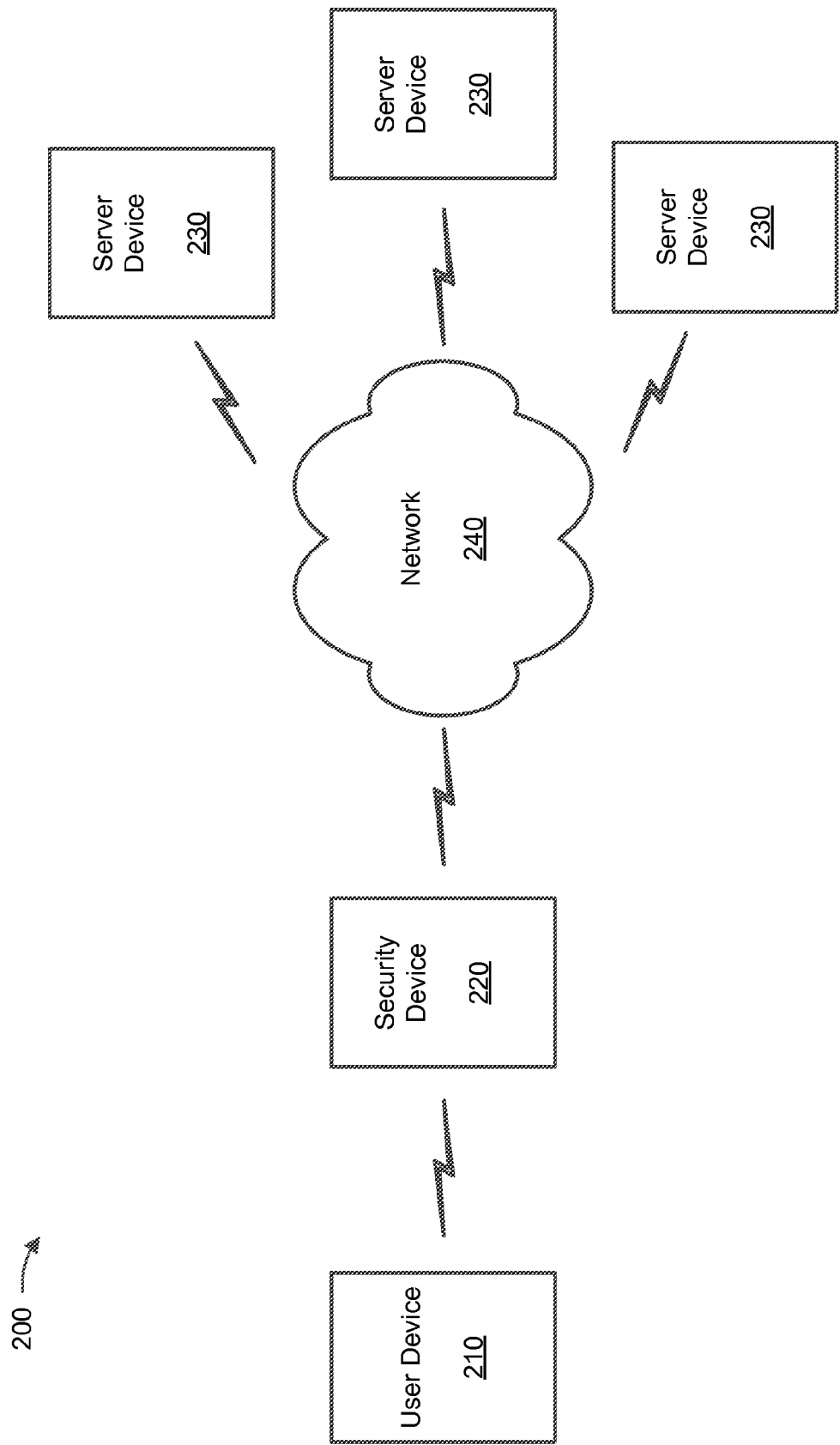

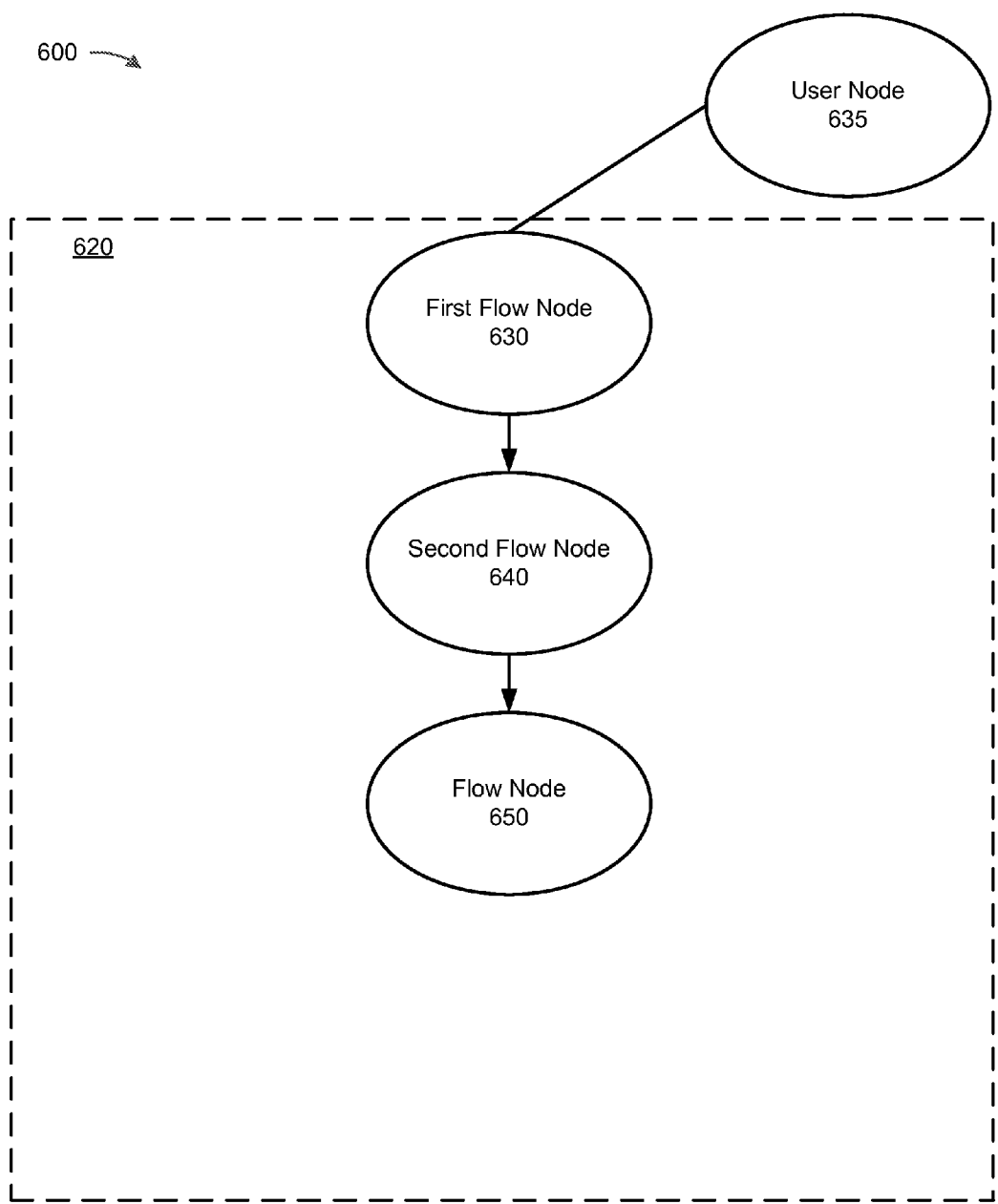

SECURITY DEVICE FOR PREEMPTIVELY DETERMINING POLICIES

BACKGROUND

Security devices are often connected between user devices and server devices. For example, a security device may receive a request from a user device to access information stored on a server device. The security device may determine a policy to apply to the request. For example, the security device may determine to block access to the information stored on the server device. Alternatively, the security device may allow access to the information stored on the server device.

SUMMARY

According to some possible implementations, a device may include one or more processors to receive a first request sent from a user device to a server. The first request may include a request to receive particular information from the server. The one or more processors may receive a response to the first request sent from the server to the user device. The response may include the particular information. The one or more processors may determine a potential request from the user device based on the particular information included in the response. The one or more processors may determine a policy associated with the potential request prior to a second request corresponding to the potential request being received. The one or more processors may receive the second request from the user device. The one or more processors may process the second request based on the policy that was determined prior to the second request being received.

According to some possible implementations, a computer-readable medium may store instructions. The instructions may include a plurality of instructions that, when executed by at least one processor of a device, may cause the at least one processor to receive a first request from a user device. The first request may request information stored by a server. The instructions may cause the at least one processor to receive a response from the server. The response may include the information requested by the first request. The instructions may cause the at least one processor to determine a potential request from the user device based on the response. The instructions may cause the at least one processor to determine a policy decision based on applying a policy to the potential request before receiving a second request corresponding to the potential request. The instructions may cause the at least one processor to receive the second request sent from the user device. The instructions may cause the at least one processor to process the second request based on the policy decision determined before the second request is received.

According to some possible implementations, a method may include receiving, by a device, a first request sent from a user device. The first request may include a request for particular information stored by a server. The method may include receiving, by the device, a response to the first request from the server. The response may include the particular information. The method may include determining, by the device, a potential request from the user device based on the particular information included in the response. The method may include preemptively determining, by the device, a preemptively determined policy associated with the potential request before a second request corresponding to the potential request is received from the user device. The method may include receiving, by the device, the second request from the user device. The method may include processing, by the device, the policy for the second request using the preemptively determined policy.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIGS. 6A-6C are diagrams of an example implementation relating to the processes shown in FIGS. 4 and 5.

DETAILED DESCRIPTION

Figure 3:
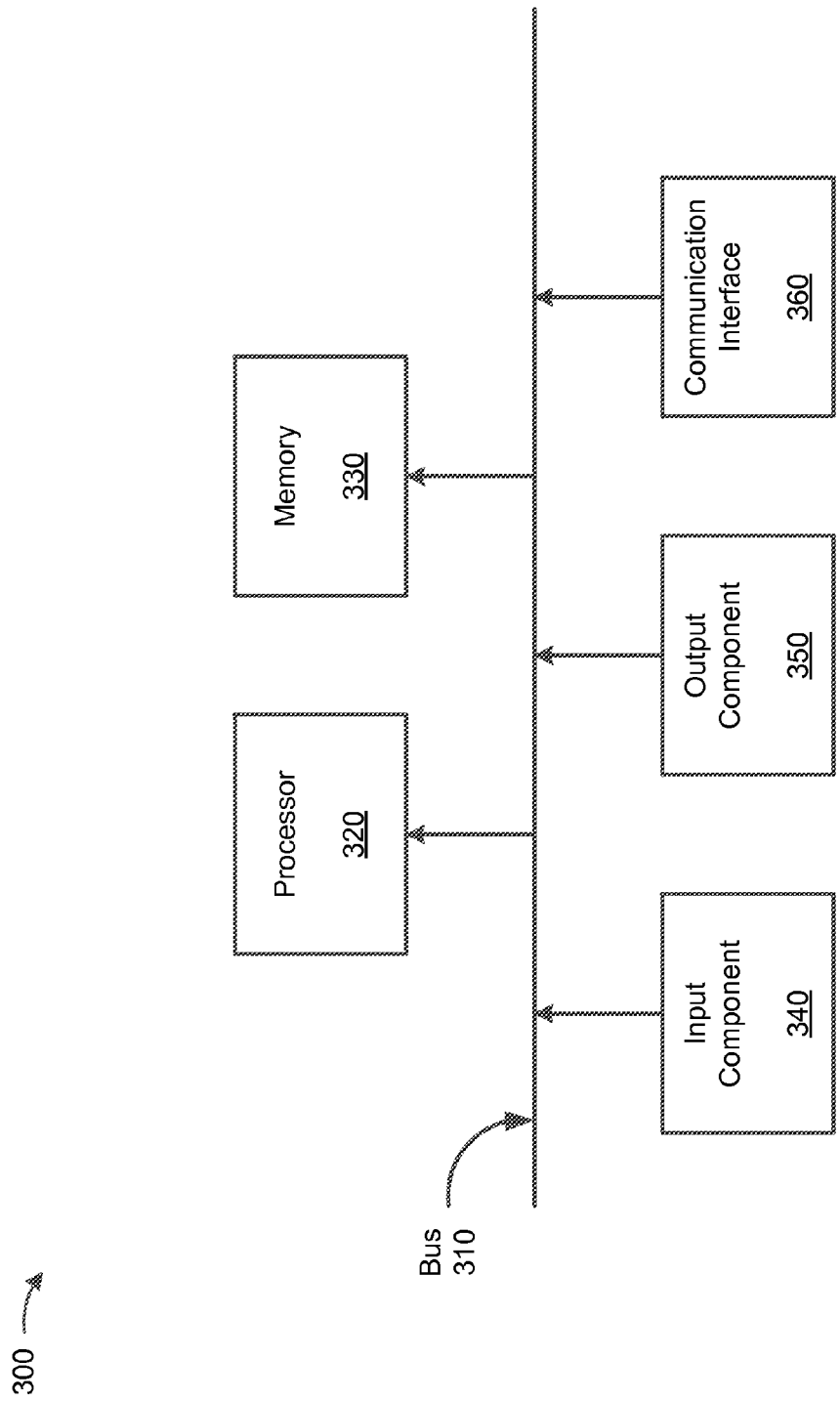
FIG. 3 is a diagram of example components of a device that corresponds to one or more devices of FIG. 2.

The following detailed description of example implementations refers to the accompanying drawings. The same reference numbers in different drawings may identify the same or similar elements.

A security device may receive a request from a user device to access information stored by a server device and may determine a policy to apply to the request. However, waiting for the request to be received, and determining the policy to apply to the request after the request is received may a cause a delay between the time the request is received and a time the policy is enforced. Implementations described herein preemptively determine a policy to apply to a potential request and determine a policy decision based on applying the policy to the potential request. Accordingly, once the request is actually received, the preemptively determined policy decision may be used to process the request and a delay caused by determining the policy decision may be reduced.

FIGS. 1A and 1B are diagrams of an overview of an example implementation 100 described herein. FIG. 1A illustrates a user device sending a first request for information to a server device. For example, the first request may be a request to access a webpage hosted by the server device. A security device may receive the first request from the user device to the server device. The security device may consult a policy data structure to determine if any policies exist for the first request. For example, a webpage may be prohibited and the security device may prohibit the user device from accessing the webpage. However, assume the information requested by the first request is not blocked and the security device allows the first request to be transmitted to the server device.

The server device may receive the first request and transmit a first response to the first request to the user device. The security device may receive the first response and determine potential requests based on the first response. For example, the first response may be a Hypertext Transfer Protocol (HTTP) response for a webpage containing hyperlinks to other webpages. The hyperlinks to the other webpages may be potential requests that the user device may request later. The security device may preemptively obtain policy information (e.g., a policy and/or a policy decision) for the potential requests by consulting a policy data structure. The security device may allow the first response to be transmitted to the user device.

FIG. 1B illustrates the user device sending a second request for information to a server device based on the first response.

Assume the second request is one of the potential requests that the security device determined based on the first response. For example, a user may have used the user device to select a hyperlink included in a webpage provided in the first response. Rather than having to consult the policy data structure to determine if policy information exists for the second request (and cause a delay), the security device may use the preemptively obtained policy information associated with the second request. For example, assume the information indicates that the second request is to be permitted. Accordingly, the security device may use the policy information to permit the second request to be transmitted to the server device. The server device may transmit a second response to the user device based on the second request.

Thus, rather than having to wait for the user device to transmit the second request to obtain the policy information, the security device may predict the second request will be made and preemptively determine policy information for the potential request. In this way, a time between the security device receiving a request and allowing the request to be transmitted to the server device may be reduced because the policy information has already been determined and does not need to be determined after the request is received from the user device.

FIG. 2 is a diagram of an example environment 200 in which systems and/or methods described herein may be implemented. As shown in FIG. 2, environment 200 may include a user device 210, a security device 220, server devices 230, and/or a network 240.

User device 210 may include a device capable of receiving and providing information. For example, user device 210 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), or a similar device. In some implementations, user device 210 may include a communication interface that allows user device 210 to receive information from and/or transmit information to security device 220 and/or another device in environment 200.

Security device 220 may include one or more devices capable of receiving, providing, generating, storing, and/or processing information received and/or provided via a network (e.g., network 240) and/or another device (e.g., server device 230, user device 210, etc.). For example, security device 220 may include a computing device, such as a server. In some implementations, security device 220 may receive information from and/or provide information to user device 210 (e.g., via network 240) and/or server device 230. Additionally, or alternatively, security device 220 may include one or more devices capable of processing and/or transferring communications (e.g., a request, a response, etc.) between user device 210 and server device 230. For example, security device 220 may include a network device, such as a reverse proxy, a server (e.g., a proxy server), a traffic transfer device, a firewall, a router, a load balancer, or the like.

Server device 230 may include one or more devices capable of processing and/or routing information. For example, server device 230 may include a server or another type of computing device. In some implementations, security device 220 may include a communication interface that allows security device 220 to receive information from and/or transmit information to other devices in environment 200.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Network 240 could be positioned between user device 210 and security device 220 and/or between security device 220 and server devices 230.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

FIG. 3 is a diagram of example components of a device 300 that corresponds to one or more devices of FIG. 2. Device 300 may correspond to user device 210, security device 220, and/or server device 230. Additionally, or alternatively, user device 210, security device 220, and/or server device 230 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Input component 340 may also include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
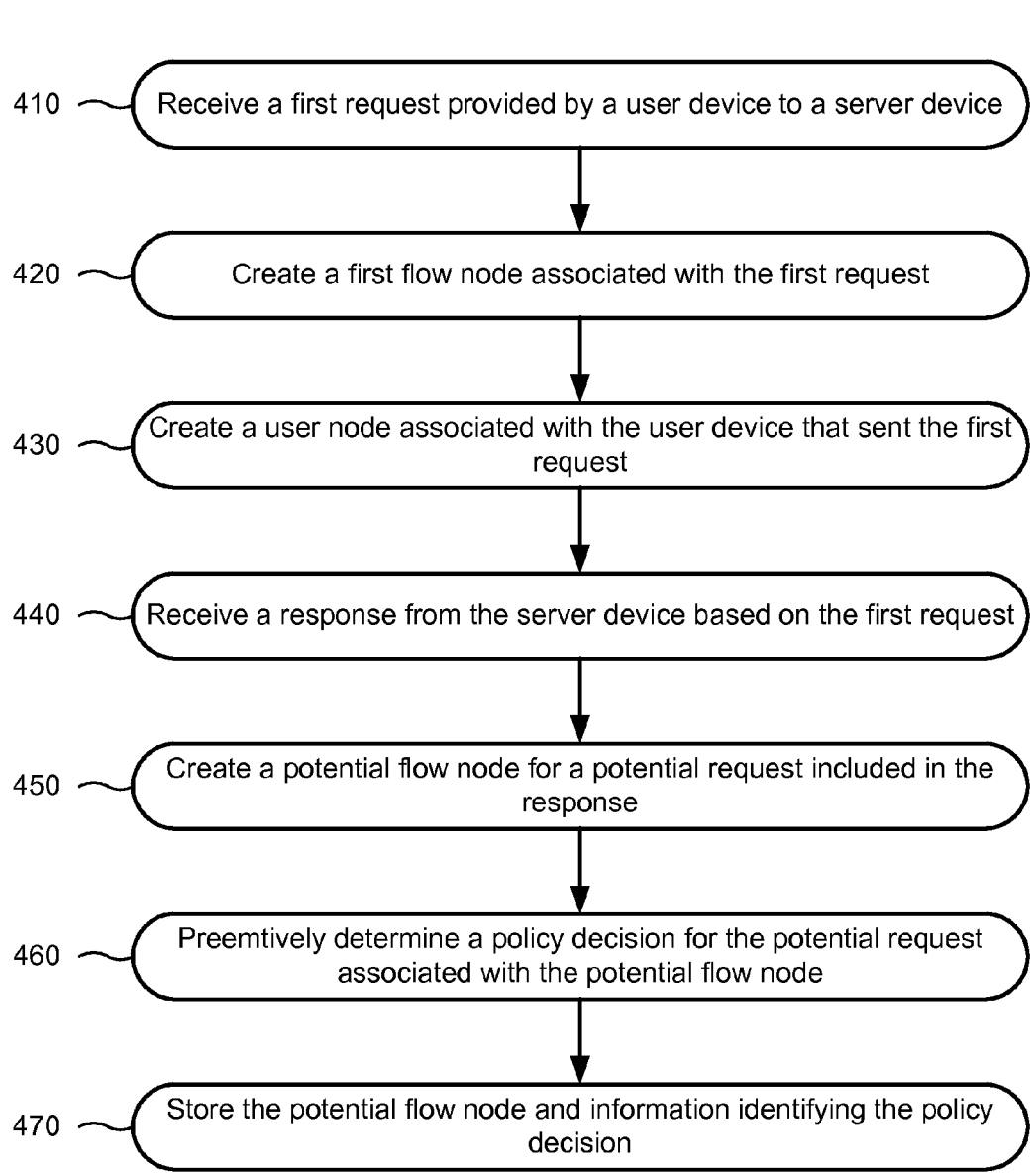
FIG. 4 is a flowchart of an example process for preemptively determining a policy for a potential request.

FIG. 4 is a flowchart of an example process 400 for preemptively determining policy information for a potential request. In some implementations, one or more process blocks of FIG. 4 may be performed by security device 220. Additionally, or alternatively, one or more process blocks of FIG. 4 may be performed by another device or a group of devices separate from or including security device 220.

A shown in FIG. 4, process 400 may include receiving a first request provided by user device 210 to server device 230 (block 410). For example, security device 220 may receive a first request from user device 210.

In some implementations, security device 220 may receive the first request sent from user device 210 to server device 230 (e.g., via security device 220 and/or network 240). The first request may include a message to provide a resource (e.g., information stored by server device 230). The first request may be a request for any kind of data over network 240. For example, the data may be web data (e.g., Hypertext Transfer Protocol (HTTP) data), email data (e.g., Simple Mail Transfer Protocol (SMTP) data), enterprise application data, etc.

In some implementations, security device 220 may use the first request to query a policy server storing policy information associated with the request. The policy server may generate a policy decision and transmit the policy decision to security device 220. Security device 220 may receive the policy decision and process the request based on the policy decision. For instance, security device 220 may process the request by permitting the request to be sent from user device 210 to server device 230.

In some implementations, security device 220 may preemptively obtain a policy decision to process the request. Processing a request based on a preemptively obtained policy decision will be discussed in greater detail in FIG. 5.

As further shown in FIG. 4, process 400 may include creating a first flow node, in a flow data structure, associated with the first request (block 420). For example, security device 220 may create the first flow node, in a flow data structure, associated with the first request.

A flow data structure may be a data structure indicating a flow of requests. The flow data structure may include one or more flow nodes associated with requests. Each flow node may represent a flow or a request from user device 210. The flow nodes may be associated with each other as parent and child. In some implementations, each flow node may be associated with a webpage, a website, and/or a domain. For example, a parent flow node may represent a parent webpage including a hyperlink to a child webpage associated with the child flow node. The child flow node may be associated with the parent flow node upon user device 210 requesting the child webpage via the parent webpage. In other words, user device 210 may access a webpage (associated with a child flow node) from a hyperlink included in another webpage (associated with the parent flow node). Each parent flow node may be associated with one or more child flow nodes. Each flow node may be a parent flow node and/or a child flow node. For example, a flow node may be both a parent flow node and a child flow node. In other words, a webpage associated with a flow node may have been accessed from a hyperlink in another webpage (e.g., a parent flow node) and may also include hyperlinks to other webpages (e.g., child flow nodes).

The first flow node may be a parent flow node and/or a child flow node. In some implementations, if creation of a child flow node with an association to the parent flow node results in a cycle in the flow data structure, then that association may be discarded.

A flow node may include information indicating a Transmission Control/Internet Protocol (TCP/IP) connection. For example, the flow node may include 5-tuple information, such as a source Internet Protocol (IP) address, a destination IP address, a source port number, a destination port number, and/or a protocol, for the flow. The flow node may include transport layer or layer 4 information, such as TCP, TCP specific information, etc. The flow node may include application layer or layer 7 information, such as protocol information (e.g., HTTP, SMTP, etc.), nested protocol information, a uniform resource identifier (URI), etc.

Security device 220 may start a new flow data structure by creating the first flow node. Additionally, or alternatively, security device 220 may obtain an existing flow data structure including a flow node associated with the first request. Thus, rather than having to create a new flow data structure each time user device 210 sends a request or starts a new session, security device 220 may obtain an existing flow data structure representing a past flow. Security device 220 may obtain an existing flow data structure and add the first flow node to the existing flow data structure. Security device 220 may store the existing flow data structure in a memory of security device 220. Additionally, or alternatively, security device 220 may obtain the existing flow data structure from another security device 220 that stores the existing flow data structure.

As further shown in FIG. 4, process 400 may include creating a user node associated with user device 210 that sent the first request (block 430). For example, security device 220 may create the user node.

The user node may include information identifying user device 210. For example, the user node may include information identifying a user device IP address, a client browser identifier, an Active Directory (AD) identity, and/or other information identifying user device 210.

In some implementations, security device 220 may associate the user node with the first flow node and/or the flow data structure. According, security device 220 may obtain the flow data structure associated with user device 210 when user device 210 transmits requests in the future.

Additionally, or alternatively, security device 220 may create an entry in a user data structure stored in a memory of security device 220 and/or a memory of another device. The entry may include the information identifying user device 210 and a pointer to flow data structure/s associated with user device 210. The user data structure may include multiple entries that associate multiple flow data structures with user device 210. Accordingly, security device 220 may obtain the flow data structure/s associated with user device 210 by searching the user data structure for the flow data structure/s associated with user device 210.

As further shown in FIG. 4, process 400 may include receiving a response from server device 230 based on the first request (block 440). For example, security device 220 may receive, from server device 230, the response based on the first request provided by user device 210.

In some implementations, server device 230 may receive the request sent from user device 210 via security device 220. Server device 230 may generate a response based on the request and transmit the response to security device 220. Security device 220 may receive the response when server device 230 provides the response.

The response may include a message, sent from server device 230 to user device 210, that includes information that may be responsive to the request. In some implementations, the message may include hyperlinks to other webpages. For example, user device 210 may send, to server device 230, a request associated with browsing a webpage hosted by server device 230, and server device 230 may generate and provide, to security device 220, a response that includes information regarding the webpage (e.g., when security device 220 is configured to receive the response).

As further shown in FIG. 4, process 400 may include creating a potential flow node based on a potential request included in the response (block 450). For example, security device 220 may create the potential flow node.

Security device 220 may analyze the response to identify various elements in the response that may lead to potential requests. For example, a hyperlink may be included in the response that leads to another webpage. Accordingly, if user device 210 selects the hyperlink, user device 210 may issue a new request. Thus, the hyperlink may represent a potential request. Security device 220 may allow the response from server device 230 to be sent to user device 210.

Security device 220 may create a potential flow node in the flow data structure for the potential request. The potential flow node may include the same kind of information included in a flow node. However, the potential flow node may not be associated with another flow node in the flow data structure until the potential request is actually requested by user device 210.

Security device 220 may create multiple potential flow nodes. For example, a response may include multiple potential requests (e.g., multiple hyperlinks). Security device 220 may create potential flow nodes for each of the potential requests.

In some implementations, security device 220 may not create potential flow nodes for hyperlinks to webpages included in a same domain as a webpage associated with the first request. A future request to a webpage on the same domain may not result in a new flow that requires a different policy decision be determined. In other words, a same connection may be used for different webpages from a same domain.

In some implementations, security device 220 may not create potential flow nodes for hyperlinks to webpages hosted by a same server device 230 as a server device 230 hosting a webpage associated with the first request. In other words, security device 220 may create potential flow nodes for hyperlinks to webpages hosted by different server devices 230 than the server device 230 hosting the webpage associated with the first request.

As further shown in FIG. 4, process 400 may include preemptively determining a policy decision for the potential request associated with the potential flow node (block 460). For example, security device 220 may preemptively determine the policy decision for the potential request.

Security device 220 may consult a policy data structure to look up a policy. Security device 220 may store the policy data structure in a memory of security device 220. Additionally, or alternatively, the policy data structure may be stored remotely in a memory of another device (e.g., a policy server device or another security device 220). Security device 220 may consult the policy data structure by searching the policy data structure for the policy associated with the potential request.

The policy data structure may include policies to apply to certain requests and/or responses. The policy data structure may include policies associated with requests. Policies may be rules to apply to a request and/or a response. For example, the policies may include throttling a connection with user device 210, adding additional bandwidth to the connection with user device 210, allowing a connection with user device 210, dropping a connection with user device 210, blocking a connection with user device 210, etc. The policies may be based on a destination IP address and/or a source IP address. In some implementations, hyperlinks and/or embedded objects (e.g., videos, images, audio files, etc.) may be categorized. Each category may be associated with a different policy. For example, a news category may include news webpages and be associated with a policy to block access to webpages in the news category. Thus, access to the news webpage may be blocked by security device 220 when user device 210 selects a hyperlink to access the news webpage.

In some implementations, security device 220 may determine the policy decision by looking up a policy in a policy data structure, obtaining information identifying the policy, applying the policy to the potential request, and determining the policy decision. For example, if a policy is to block access to news webpages and a request is for a news webpage, security device 220 may determine a policy decision to block access to the news webpage. Additionally, or alternatively, security device 220 may determine the policy decision by obtaining the policy decision from a policy server device. For example, security device 220 may transmit information identifying the request to a policy server device. The policy server device may receive the information, determine the policy decision, and transmit the policy decision to security device 220. Security device 220 may receive the policy decision and store the policy decision.

In some implementations, security device 220 may send a request to the policy server device requesting policies and/or policy decisions for multiple potential flow nodes associated with multiple hyperlinks (e.g., all or a subset of the hyperlinks in the response to the first request). Accordingly, security device 220 will be ready with a preemptively determined policy decision to use to process a request resulting from whichever hyperlink user device 210 later selects.

In some implementations, a display of hyperlink to a webpage may result in multiple requests to obtain resources embedded in the webpage. Security device 220 may determine policy decisions for each request (or a subset of requests) resulting from displaying the webpage.

In some implementations, security device 220 may determine policy decisions associated with each of the potential flow nodes. In other words, security device 220 may preemptively determine policy decisions for each of the potential requests stemming from the response.

Additionally, or alternatively, security device 220 may determine policy decisions associated with some of the potential flow nodes. For example, there may be numerous potential flow nodes and determining policies associated with each of the potential flow nodes may use a great deal of resources. Accordingly, the potential flow nodes may be weighted and/or scored, and potential flow nodes having a score that satisfies a predetermined threshold may have a policy decision preemptively determined. Additionally, or alternatively, a particular number of potential flow nodes with the highest scores may have policy decisions preemptively determined. Additionally, or alternatively, security device 220 may determine the policy decisions for the potential flow nodes in an order based on the scores for the potential flow nodes.

Scoring the potential flow nodes may be based on a variety of factors. For example, the score may be based on a measure of prominence of a hyperlink (i.e., a potential request associated with the potential flow node) on a webpage when the webpage is displayed (e.g., a bold HTML tag, a font size, a font color, or a location on the webpage), a semantic analysis of anchor text for a hyperlink (e.g., "click this now"), a measure of importance of keywords in anchor text and/or text near the anchor text, etc. Security device 220 may obtain information for scoring the potential flow nodes by analyzing the response (e.g., an HTML response including information on the elements to be displayed by a browser).

Security device 220 may also, or alternatively, base the score on subsequent feedback indicating whether the hyperlink was selected by user device 210. For example, such feedback may be acquired from user device 210 and stored in flow data structures. The feedback mechanism may also be strengthened, for example, by security device 220 actually parsing the HTTP request header from user device 210 and determining the referrer webpage—the page that actually led to this HTTP request being generated from user device 210. The score may also, or alternatively, be based on how often the hyperlink is present on the webpage over a period time or how often the hyperlink changes over the period of time. For example, a hyperlink on a webpage may relate to an advertisement. The advertisement (or hyperlink) may change each time the webpage is accessed or change multiple times within each access to the webpage. Accordingly, preemptively determining a policy decision for such a hyperlink may not be productive because the policy decision may not apply if the advertisement or hyperlink changes. Accordingly, potential flow nodes associated with hyperlinks, that change more often than a threshold value, may be given a first score and/or not have a policy decision preemptively determined. In other words, security device 220 may practice a kind of machine learning for what kind of hyperlinks or potential requests are likely to be selected by a user device 210 and/or prove beneficial to preemptively obtain policy information.

As further shown in FIG. 4, process 400 may include storing the potential flow node and information identifying the policy decision (block 470). For example, security device 220 may store the potential flow node and the information identifying the policy decision.

Security device 220 may store the potential flow node and the information identifying the policy decision in a memory included in security device 220. Additionally, or alternatively, the potential flow node and the information identifying the policy decision may be stored remotely in a memory of another device.

In some implementations, security device 220 may store the potential flow node and/or the policy decision in the flow data structure including the first flow node. For example, the potential flow node may include the policy decision and the potential flow node may be stored in the flow data structure as a child flow node to the first flow node (e.g., a parent flow node). Additionally, or alternatively, security device 220 may store a pointer to the flow data structure and/or the potential flow node in the user data structure such that the potential flow node is associated with user device 210. Accordingly, security device 220 may obtain the potential flow node and/or the policy decision at a later time when user device 210 transmits another request.

While a series of blocks has been described with regard to FIG. 4, the blocks and/or the order of the blocks may be modified in some implementations. Additionally, or alternatively, non-dependent blocks may be performed in parallel.

Figure 5:
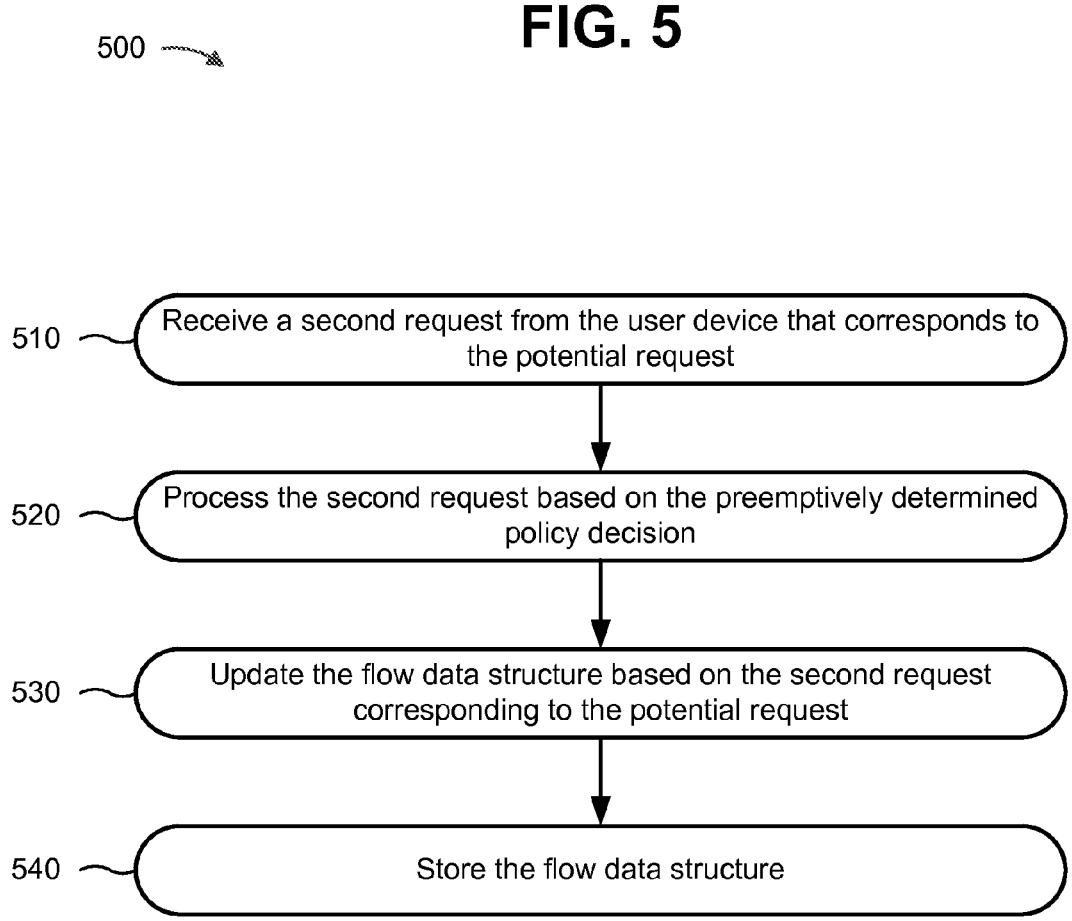
FIG. 5 is a flowchart of an example process for enforcing the preemptively determined policy.

FIG. 5 is a flowchart of an example process 500 for enforcing the preemptively determined policy decision. In some implementations, one or more process blocks of FIG. 5 may be performed by security device 220. Additionally, or alternatively, one or more process blocks of FIG. 5 may be performed by another device or a group of devices separate from or including security device 220.

As shown in FIG. 5, process 500 may include receiving a second request from user device 210 that corresponds to the potential request (block 510). For example, security device 220 may receive the second request from user device 210. Assume that the second request is a request to access information via a hyperlink for which the potential flow node was created at block 450 in FIG. 4.

The second request may be the potential request determined at block 450. Thus, the potential request turns into an actual request when user device 210 actually makes the request.

A user of user device 210 may input an instruction to select the hyperlink to access information stored on a server device 230 or another device. For example, the user may click on a hyperlink displayed by a browser on user device 210. User device 210 may transmit the second request (corresponding to the potential request) to server device 230 based on selecting the hyperlink. The second request may include a message to provide information stored by server device 230. In some implementations, security device 220 may receive the second request by receiving the second request sent from user device 210 to server device 230.

As further shown in FIG. 5, process 500 may include processing the second request based on the preemptively determined policy decision (block 520). For example, security device 220 may process the second request based on the preemptively determined policy decision.

A policy decision may be a decision based on a rule applied to a request and/or a response. For example, a policy decision may include throttling a connection with user device 210, adding additional bandwidth to the connection with user device 210, allowing a connection with user device 210, dropping a connection with user device 210, blocking a connection with user device 210, etc. Accordingly, security device 220 may process the second request by throttling a connection with user device 210, adding additional bandwidth to the connection with user device 210, allowing user device 210 to access information via the hyperlink, blocking user device 210 from accessing information via the hyperlink, etc.

In some implementations, security device 220 may search the user data structure to identify flow data structures associated with user device 210. Security device 220 may obtain the preemptively determined policy decision for the second request by searching flow data structures including the first flow node and the potential flow node corresponding to the second request. In some implementations, security device 220 may store the flow data structure including the first flow node and the potential flow node in a buffer when the first request is processed. The flow data structure may be stored to be associated with information identifying user device 210.

Thus, server device 220 may access the flow data structure from the buffer when the second request is received from user device 210 and the preemptively determined policy decision associated with the second request may be obtained from the potential flow node included in the flow data structure.

Using the preemptively determined policy decision may reduce the time between receiving the second request and processing the second request. For instance, if the preemptively determined policy decision were not used, security device 220 may consult the policy data structure after receiving the second request to obtain a policy decision for the request. Consulting the policy data structure may cause a delay between receiving the second request and processing the request, especially if security device 220 receives multiple requests from multiple user devices 210. On the other hand, by preemptively determining the policy decision before the second request is actually received (i.e., consulting the policy data structure before the second request is received), the delay caused by consulting the policy data structure after the second request is received may be avoided. Additionally, or alternatively, security device 220 may be better able, than previous methods, to adapt to request and response application behavior from user device 210 and/or server device 230 in terms of allocating network resources. For example, security device 220 may allocate network resources based on the preemptively determined policy decisions and/or the flow data structure in anticipation of potential requests becoming actual requests.

As further shown in FIG. 5, process 500 may include updating the flow data structure based on the second request corresponding to the potential request (block 530). For example, security device 220 may update the flow data structure based on the second request corresponding to the potential request.

When the potential request is actually received as the second request, the potential flow node becomes a second flow node in the flow data structure. The second flow node (i.e., the potential flow node) is associated with the first flow node. For example, the second flow node may be a child flow node from the first flow node (i.e., a parent flow node). In other words, the flow data structure indicates that the second request was based on the response to the first request. Accordingly, a flow may be established indicating a chain of requests. Thus, security device 220 may update the flow data structure by associating the potential flow node with the first flow node.

As further shown in FIG. 5, process 500 may include storing the flow data structure (block 540). For example, security device 220 may store the flow data structure.

Security device 220 may store the flow data structure in a memory included in security device 220. Additionally, or alternatively security device 220 may store the flow data structure in another device.

The flow data structure associated with the user node may be used to predict future flows for the user. For example, a user may have a pattern of visiting webpages or selecting links in emails as indicated in the flow data structure. Based on this past behavior, security device 220 may predict what flow (i.e., what potential request) the user may issue next. For instance, the past behavior may be used as feedback to alter the scoring of potential flow nodes at block 460 in FIG. 4. Accordingly, potential requests and policy decisions associated with the potential requests may be better predicted. Additionally, or alternatively, the flow data structure may be obtained at block 420 in FIG. 4 and added to by repeating processes 400 and 500 for subsequent requests.

The flow data structure may be used to predict future flows for user device 210 and/or other user devices 210. For example, the flow data structure may be used to predict future flows for user device 210 associated with the flow data structure. Additionally, or alternatively, the flow data structure may be used to predict flows for other user devices 210. For example, if a number of user devices 210 have flow data structures with a same parent flow node associated with a same child flow node, security device 220 may predict another user device 210 may request information associated with the child flow node once a response for the parent flow node has been obtained. For instance, if a user accesses a first webpage with a hyperlink to a second webpage, security device 220 may predict user device 210 will access the second webpage via the hyperlink based on other users having done the same. The information indicating which webpages were accessed may be used as feedback to score potential flow nodes at block 460 in FIG. 4. For example, a potential flow node corresponding to a flow node associated with previously requested information may be given a score indicating there is an increased likelihood that information associated with the potential flow node will be requested.

Some potential flow nodes created at block 430 in FIG. 4 may not be added to the flow data structure. In other words, not all the potential flow nodes may become actual flow nodes because the associated potential requests were not actually requested later. In some implementations, these potential flow nodes may be deleted. In some implementations, security device 220 may store these potential flow nodes in a memory included in security device 220 and/or another device (e.g., a cloud device). The potential flow nodes may be pushed or sent to other security devices 220 by security device 220 and/or the other device (e.g., the cloud device). Likewise, the flow data structure and/or the user data structure may be pushed or sent to other security devices 220 by security device 220 and/or the other device (e.g., the cloud device).

In some implementations, security device 220 may send the potential flow nodes to user device 210 for storage and user device 210 may store the potential flow nodes. For example, security device 220 may embed the potential flow nodes in cookies (e.g., HTTP cookies or web cookies) sent to user device 210 and stored in a browser. If user device 210 sends the first request again later, user device 210 may also send the potential flow nodes embedded in the cookies to security device 220. Similarly, security device 220 may also, or alternatively, embed potential flow nodes in clickable links in emails (e.g., web beacons). In this way, security device 220 may obtain the potential flow nodes without having to recreate the potential flow nodes. Moreover, security device 220 may obtain the potential flow nodes without using resources to store and/or recreate the potential flow nodes. Furthermore, if user device 210 attempts to access information from server device 230 via a different security device 220, user device 210 may send the potential flow nodes to the different security device 220 using the cookies and/or the web beacons.

While a series of blocks has been described with regard to FIG. 5, the blocks and/or the order of the blocks may be modified in some implementations. Additionally, or alternatively, non-dependent blocks may be performed in parallel.

Figure 6A:
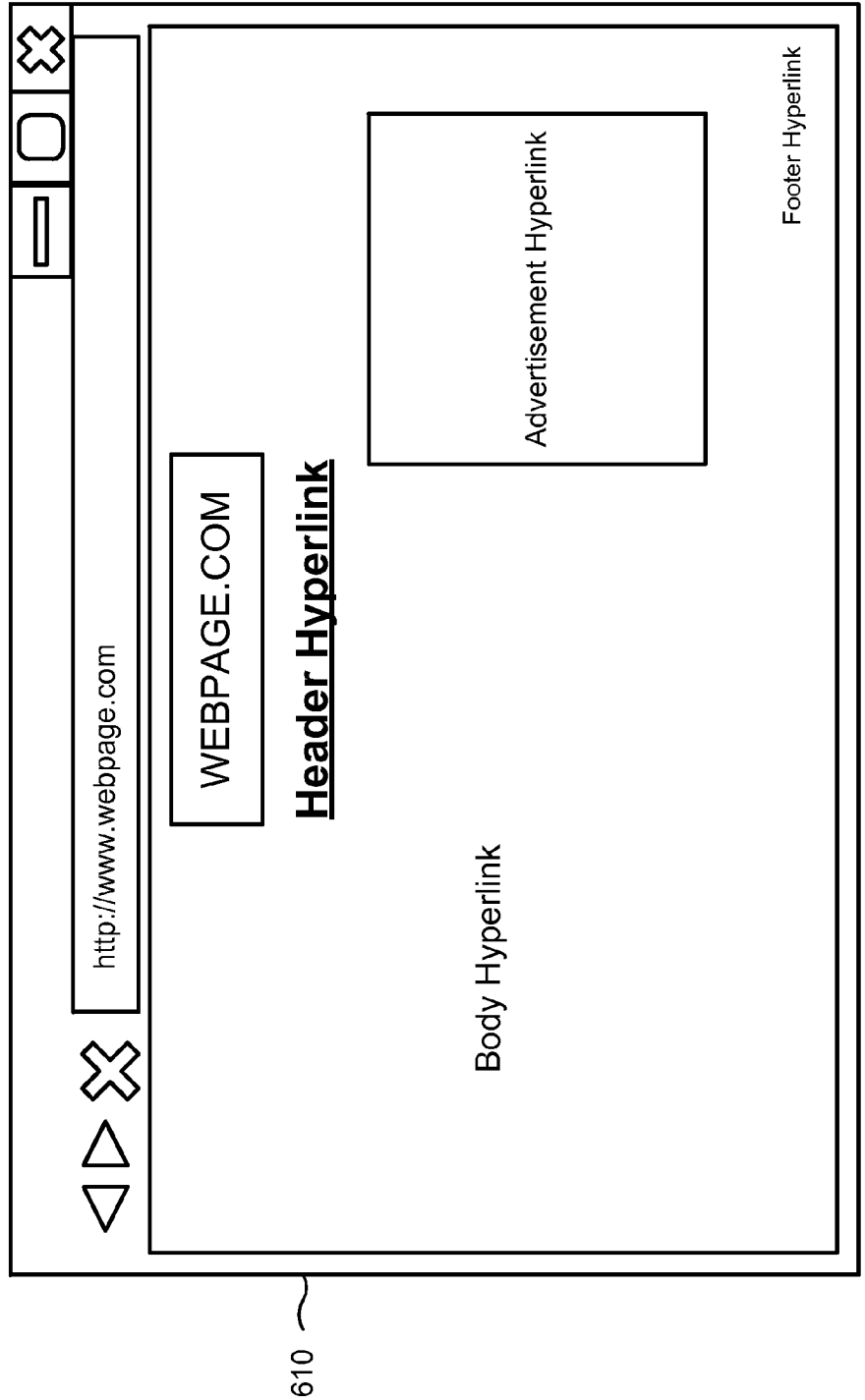
Figure 6B:
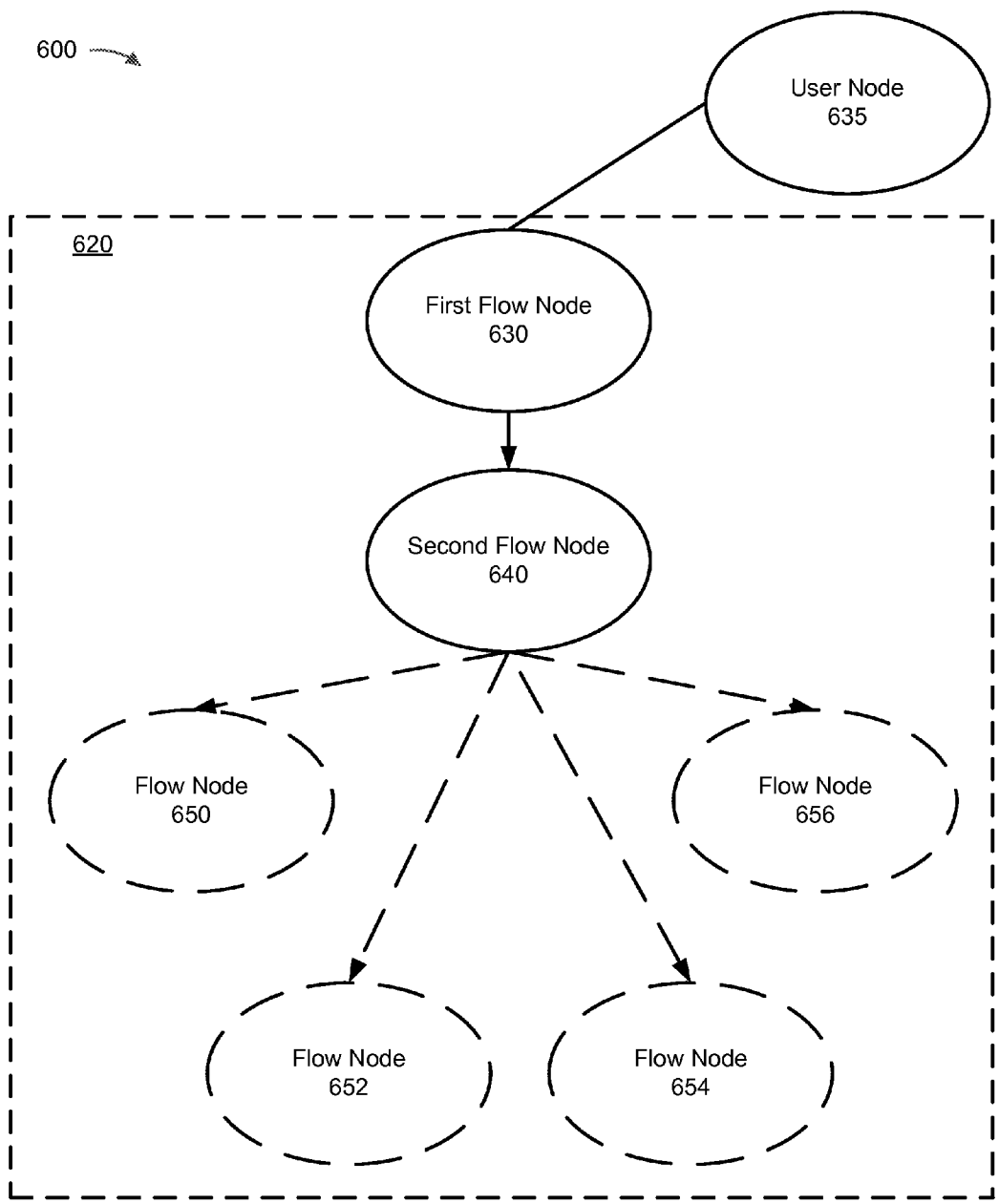

FIGS. 6A-6C are diagrams of an example implementation 600 relating to processes 400 and 500 shown in FIGS. 4 and 5.

FIG. 6A illustrates a browser 610 displayed on user device 210. A user may input a Uniform Resource Locator (URL) into an address bar of browser 610. For example, the user may input "http://www.webpage.com" into the address bar of browser 610. Browser 610, via user device 210, may consult a Domain Name System (DNS) name server to obtain an IP address for a domain name corresponding to the URL by sending a DNS request to the DNS name server.

Security device 220 may receive the DNS request from user device 210 to the DNS name server and create, in a flow data structure 620, a first flow node 630 corresponding to the DNS request, as shown in FIG. 6B. FIG. 6B depicts an example flow data structure 620 illustrated as a flow graph. Flow data structure 620 is supplied as an example to show the association between flow nodes and potential flow nodes in example implementation 600.

Additionally, or alternatively, security device 220 may associate flow node 630 and/or the flow data structure 620 with a user node 635, as shown in FIG. 6B. User node 635 may include information identifying user device 210. User node 635 may be associated with multiple flow data structures.

In some implementations, security device 220 may consult a policy data structure to obtain a policy decision for the DNS request. Assume the policy decision indicates the DNS request is allowed to be sent. Security device 220 may process the DNS request by allowing the DNS request to be sent to the DNS name server. The DNS name server may generate a DNS response including an IP address for the domain requested in the DNS request. The DNS name server may transmit the DNS response to user device 210. Security device 220 may receive the DNS response and store the IP address. Security device 220 may allow the DNS response to be transmitted to user device 210.

Browser 610 may open a HTTP connection to the IP address by sending a first HTTP request to server device 230. Security device 220 may receive the HTTP request and create a second flow node 640 in flow data structure 620 as illustrated in FIG. 6B. Furthermore, security device 220 may recognize a destination IP address for the HTTP connection is the same IP address in the DNS response related to the DNS request. Accordingly, security device 220 may determine that the HTTP request is related to the DNS request and create an association between the first flow node 630 and the second flow node 640 in flow data structure 620. Security device 220 may consult a policy data structure to obtain a policy decision for the HTTP request. Assume the policy decision indicates the HTTP request is allowed to be sent. Security device 220 may process the HTTP request by allowing the first HTTP request to be sent to server device 230.

Server device 230 may generate a HTTP response including hyperlinks to other webpages associated with different domains. For example, the HTTP response may include a header hyperlink, a body hyperlink, an advertisement hyperlink, and a footer hyperlink as shown in FIG. 6A. Server device 230 may transmit the HTTP response to user device 210, and security device 220 may receive the HTTP response and recognize the hyperlinks.

Security device 220 may create potential flow nodes for some or all of the hyperlinks. For example, security device 220 may create a flow node 650 associated with the header hyperlink, a flow node 652 associated with the body hyperlink, a flow node 654 associated with the footer hyperlink, and a flow node 656 associated with the advertisement hyperlink. Each of flow nodes 650, 652, 654, and 656 are potential flow nodes that represent a potential association with second flow node 640 as represented by dashed lines in FIG. 6B.

Security device 220 may calculate a score for each respective flow node 650, 652, 654, and 656. For example, security device 220 may calculate a score for flow nodes 650, 652, 654, and 656 based on how prominent the respective hyperlinks (i.e., a potential request) are displayed on the webpage (e.g., a bold HTML tag or a location on the webpage). Security device 220 may calculate a first score for flow node 650 based on the header hyperlink being positioned at the top of the webpage, the size of the header hyperlink, a semantic analysis of the anchor text of the header hyperlink, and/or the font used for the header hyperlink. Security device 220 may calculate a second score for flow node 652 based on the positioning of the body hyperlink at the left of the webpage, the size of the body hyperlink, a semantic analysis of the anchor text of the body hyperlink, and/or the font used for the body hyperlink. Security device 220 may calculate a third score for flow node 654 based on the location of the footer hyperlink at the bottom of the webpage, the size of the footer hyperlink, and/or a semantic analysis of the anchor text of the footer hyperlink. Security device 220 may recognize that the advertisement hyperlink changes often and may calculate a fourth score for the flow node 656. For example, security device 220 may recognize the advertisement hyperlink changes often based on past experience with the webpage, the location of the advertisement hyperlink on the webpage, a semantic analysis of the anchor text of the advertisement hyperlink, and/or an IP address associated with the advertisement hyperlink.

Assume flow node 650 and flow node 652 have scores that meet a threshold. Further, assume potential flow node 654 and potential flow node 656 have scores that do not meet the threshold. Accordingly, security device 220 may consult a policy data structure to preemptively determine policy decisions for flow node 650 and flow node 652, and may not preemptively determine policy decisions for flow node 654 and flow node 656. Security device 220 may obtain the policies from the policy data structure, determine policy decisions based on the policies and the potential requests, and store the policy decisions for flow node 650 and flow node 652.

Security device 220 may allow the HTTP response to be transmitted to user device 210. The user may input an instruction to user device 210 to select a hyperlink in the HTTP response. For example, the user may click on the header hyperlink displayed by browser 610. User device 210 may send a second HTTP request based on the header hyperlink being selected. Security device 220 may receive the second HTTP request and process the second HTTP request based on the preemptively determined policy decision for flow node 650 associated with the header hyperlink. For example, security device 220 may increase the bandwidth for the HTTP connection and allow the second HTTP request to be sent to server device 230 based on the policy decision associated with the flow node 650. Accordingly, rather than waiting for the second HTTP request be received to consult the policy data structure, security device 220 may preemptively determine the policy decision.

Security device 220 may convert flow node 650 from a potential flow node into a real flow node by creating an association between flow node 650 and second flow node 640. For example, security device 220 may create the association based on the second HTTP request stemming from the first response. FIG. 6C illustrates an updated flow data structure 620 with the associated between flow node 650 and second flow node 640. Because the body hyperlink, the footer hyperlink, and the advertisement hyperlink were not selected by the user, the associated potential flow nodes 652, 654, and 656 may be deleted as shown in FIG. 6C. Additionally, or alternatively, potential flow nodes 652, 654, and 656 may be embedded in cookies and stored by user device 210. Security device 220 may store updated flow data structure 620.

In some implementations, security device 220 may use flow data structure 620 to predict future flows (i.e., future requests) for user device 210. For example, if user device 210 sends a request for webpage.com again, security device 220 may obtain flow data structure 620 from storage and predict that user device 210 will subsequently execute the header hyperlink based on flow data structure 620 indicating a relationship between flow node 650 and flow node 640. In some implementations, security device 220 may recreate potential flow nodes 652, 654, and 656 and may preemptively determine policy decisions. Additionally, or alternatively, security device 220 may obtain potential flow nodes 652, 654, and 656 from cookies and/or web beacons sent by user device 210.

Implementations described herein predict potential requests and preemptively determine policy decisions to apply to the potential requests. Accordingly, once a potential request is actually received, the preemptively determined policy decision may be used and a delay caused by determining the policy decision may be reduced.

The foregoing disclosure provides illustration and description, but is not intended to be exhaustive or to limit the implementations to the precise form disclosed. Modifications and variations are possible in light of the above disclosure or may be acquired from practice of the implementations.

For example, user device 210 may include a management application that performs the functions of security device 220. Thus, security device 220 and user device 210 may be a same device. Additionally, or alternatively, security device 220 and server device 230 may be a same device or act in conjunction with each other if security device 220 is able to provide feedback to server device 230 about what server resources (e.g., a webpage, etc.) user device 210 may request next. This feedback may help server device 230 to reserve server-side resources for the next request.

While implementations described herein used a hyperlink as an example of a potential request, a potential request is not limited to a hyperlink. For example, the potential request may correspond to an IP address in a DNS answer (e.g., security server 220 may predict that user device 210 will send a request to an IP address included in a DNS answer). Additionally, or alternatively, the potential request may correspond to metadata included in a HTTP response header (e.g., security server 220 may predict that user device 210 will send a request based on the metadata).

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
 a memory; and
 one or more processors, operatively connected to the memory, to:
  receive a first request sent from a user device to a server, the first request including a request to receive particular information from the server;
  receive a response to the first request sent from the server to the user device,
   the response including the particular information;
  predict potential requests from the user device based on the particular information included in the response;
  assign scores to the potential requests;
  determine whether to preemptively determine a policy associated with each of the potential requests based on the scores;
  preemptively determine a policy associated with a potential request, of the potential requests, prior to a second request corresponding to the potential request being received;
  receive the second request from the user device; and
  process the second request, after the second request is received from the user device, based on the policy that was determined prior to the second request being received from the user device.

2. The device of claim 1, where the potential request corresponds to at least one of a hyperlink included in the response, an IP address included in the response, or metadata included in the response.

3. The device of claim 1, where the one or more processors are further to:
 determine a policy decision based on the policy and the potential request; and
 where the one or more processors, when processing the second request, are further to:
  process the second request based on the policy decision.

4. The device of claim 1, where the one or more processors, when determining the policy, are further to:
 search a policy data structure for the policy associated with the potential request,
  the policy data structure including a plurality of policies associated with a plurality of requests.

5. The device of claim 1, where the one or more processors are further to:

determine a plurality of policies associated with more than one of the potential requests prior to receiving requests corresponding to the more than one of the potential requests,
the plurality of policies including the policy, and
the more than one of the potential requests including the potential request.

6. The device of claim 1, where the one or more processors, when processing the second request, are further to:
permit the second request to be transmitted to another device based on the policy.

7. The device of claim 1, where the one or more processors, when processing the second request, are further to:
at least one of block the second request from being transmitted to the server based on the policy, throttle a connection with the user device based on the policy, or increase bandwidth to the user device based on the policy.

8. A non-transitory computer-readable medium storing instructions, the instructions comprising:
a plurality of instructions that, when executed by at least one processor of a device, cause the at least one processor to:
receive a first request from a user device,
the first request requesting information stored by a server;
receive a response from the server,
the response including the information requested by the first request;
predict potential requests from the user device based on the response;
assign scores to the potential requests;
for each of the potential requests, determine whether to preemptively determine a policy decision associated with a respective potential request based on a score assigned to the respective potential request;
preemptively determine a policy decision for a potential request, of the potential requests, based on applying a policy to the potential request before receiving a second request corresponding to the potential request;
receive the second request from the user device; and
process the second request, after the second request is received from the user device, based on the policy decision determined before the second request is received from the user device.

9. The non-transitory computer-readable medium of claim 8, where the plurality of instructions further cause the at least one processor to:
generate first flow information in a flow data structure based on the first request,
the flow data structure indicating a flow of requests, and
the first flow information identifying at least one of a source of the first request, a destination of the first request, a protocol associated with the first request, or a port associated with the first request;
generate second flow information in the flow data structure based on the second request,
the second flow information including at least one of a source of the second request, a destination of the second request, a protocol associated with the second request, or a port associated with the second request; and
associate the first flow information with the second flow information in the flow data structure.

10. The non-transitory computer-readable medium of claim 9, where the plurality of instructions further cause the at least one processor to:
associate user information identifying the user device with the first flow information and the second flow information.

11. The non-transitory computer-readable medium of claim 9, where the plurality of instructions further cause the at least one processor to:
associate user information identifying the user device with a plurality of flow data structures associated with a plurality of flows,
the plurality of flow data structures including the flow data structure.

12. The non-transitory computer-readable medium of claim 8, where the plurality of instructions further cause the at least one processor to:
generate potential flow information for the plurality of potential requests,
the potential flow information including at least one of a source of the potential requests, a destination of the potential requests, a protocol associated with the potential requests, or a port associated with the potential requests.

13. The non-transitory computer-readable medium of claim 12, where the plurality of instructions further cause the at least one processor to:
add the potential flow information associated with the potential request to a flow data structure,
the flow data structure including first flow information associated with the first request; and
associate the potential flow information with the first flow information in the flow data structure based on receiving the second request.

14. The non-transitory computer-readable medium of claim 12, where the plurality of instructions further cause the at least one processor to:
transmit the potential flow information to the user device for storage.

15. The non-transitory computer-readable medium of claim 8, where the plurality of instructions further cause the at least one processor to:
identify a flow data structure associated with the user device,
the flow data structure including first flow information associated with the first request, and
the flow data structure including second flow information associated with the potential request; and
determine the potential request from the response based on the flow data structure.

16. A method, comprising:
receiving, by a device, a first request from a user device,
the first request including a request for particular information stored by a server;
receiving, by the device, a response to the first request from the server,
the response including the particular information;
determining, by the device, potential requests from the user device based on the particular information included in the response;
assigning, by the device, scores to the potential requests;
determining, by the device, whether to preemptively determine a preemptively determined policy associated with each of the potential requests based on the scores;
preemptively determining, by the device, a preemptively determined policy associated with a potential request, of the potential requests, before a second request corresponding to the potential request is received from the user device;

receiving, by the device, the second request from the user device; and processing, by the device and after the second request is received from the user device, the second request using the preemptively determined policy that was determined prior to the second request being received from the user device.

17. The method of claim 16, further comprising:

preemptively determining a plurality of preemptively determined policies associated with the potential requests based on the scores, the plurality of preemptively determined policies including the preemptively determined policy.

18. The method of claim 17, where the plurality of potential requests correspond to a plurality of hyperlinks, and the method further comprising:

assigning the scores to each respective hyperlink, of the plurality of hyperlinks, based on at least one of a measure of prominence of how a respective hyperlink is to be displayed in a browser, a semantic analysis of anchor text for the respective hyperlink, or a measure of importance of keywords associated with the respective hyperlink; and preemptively determining the plurality of preemptively determined policies for hyperlinks, of the plurality of hyperlinks, associated with scores that satisfy a threshold.

19. The method of claim 17, where the plurality of potential requests correspond to a hyperlinks, and the method further comprising:

assigning the scores to each respective hyperlink, of the plurality of hyperlinks, based on subsequent feedback indicating whether a respective hyperlink, of the plurality of hyperlinks, was selected by the user device; and preemptively determining the plurality of preemptively determined policies for hyperlinks, of the plurality of hyperlinks, associated with scores that satisfy a threshold.

20. The method of claim 17, further comprising:

preemptively determining the plurality of preemptively determined policies for potential requests associated with scores that satisfy a threshold.

\* \* \* \* \*

UNITED STATES PATENT AND TRADEMARK OFFICE
CERTIFICATE OF CORRECTION

| | | |
|---|---|---|
| PATENT NO. | : 9,112,912 B1 | Page 1 of 1 |
| APPLICATION NO. | : 14/162187 | |
| DATED | : August 18, 2015 | |
| INVENTOR(S) | : Anand et al. | |

It is certified that error appears in the above-identified patent and that said Letters Patent is hereby corrected as shown below:

In the claims

Claim 12:

Column 18, line 15, after "information for the" delete "plurality of".

Claim 18:

Column 19, line 14, after "where the" delete "plurality of".

Claim 19:

Column 20, line 5, after "where the" delete "plurality of".

Signed and Sealed this
Sixteenth Day of August, 2016

Michelle K. Lee
*Director of the United States Patent and Trademark Office*